73-666

SR

OR 2,725,745

A

Dec. 6, 1955 R. M. HUBBARD ET AL 2,725,745

MECHANICAL VIBRATION TESTING MACHINE

Filed Feb. 29, 1952 4 Sheets-Sheet 1

*INVENTORS.*
R. M. HUBBARD
*BY* J. T. HART, JR.
G. D. O'Brien
R. M. Hicks ATTYS.

MECHANICAL VIBRATION TESTING MACHINE

INVENTORS.
R. M. HUBBARD
J. T. HART, JR.
BY
ATTYS.

MECHANICAL VIBRATION TESTING MACHINE

Filed Feb. 29, 1952

INVENTORS.
R. M. HUBBARD
J. T. HART, JR.
BY
G. A. O'Brien
R. M. Hicks
ATTYS.

MECHANICAL VIBRATION TESTING MACHINE
Filed Feb. 29, 1952 4 Sheets-Sheet 4
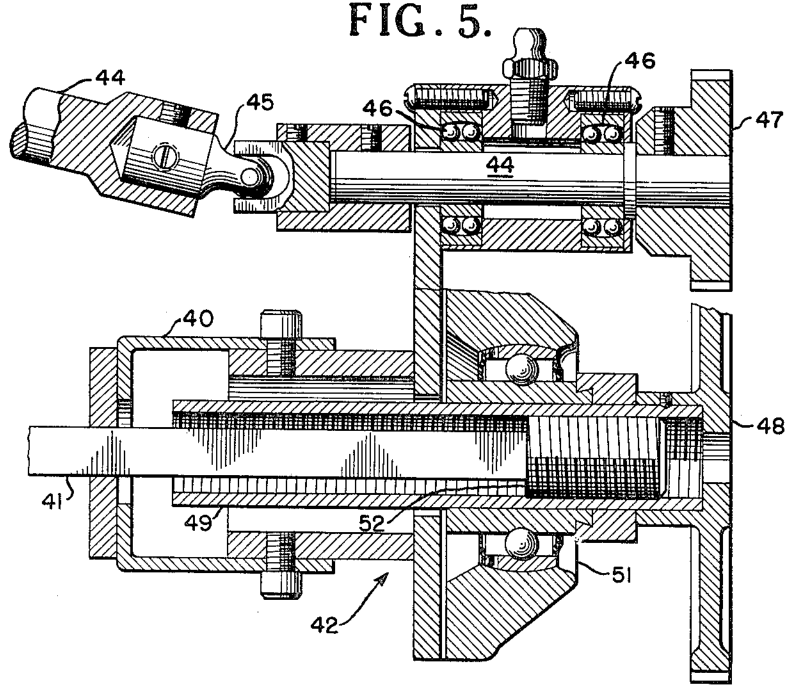
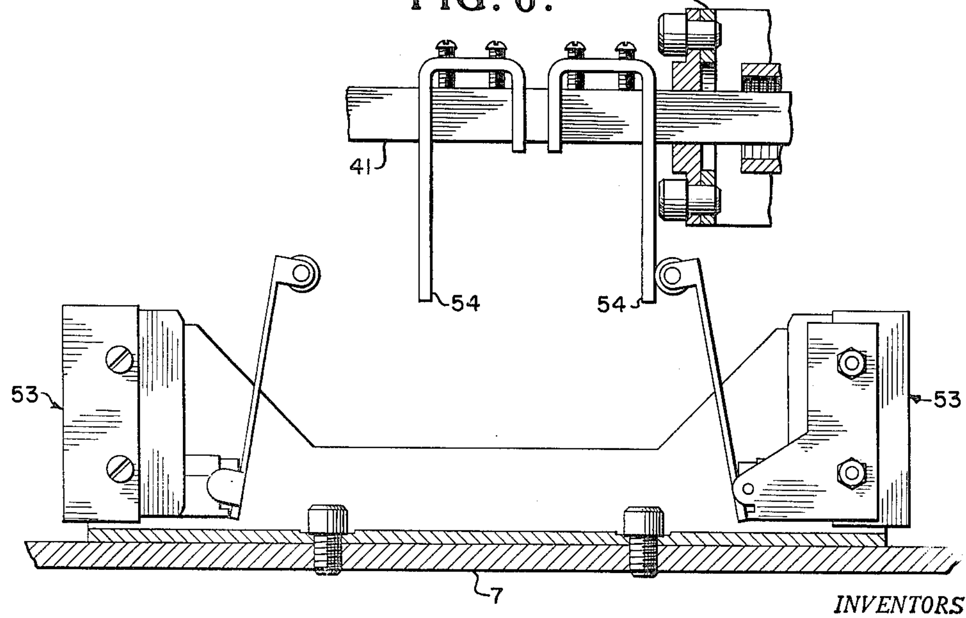
INVENTORS.
R. M. HUBBARD
J. T. HART, JR.
BY
G. D. O'Brien
R. M. Hicks
ATTYS.

United States Patent Office 2,725,745

Patented Dec. 6, 1955

2,725,745

MECHANICAL VIBRATION TESTING MACHINE

Robert M. Hubbard, Clarence Center, N. Y., and John T. Hart, Jr., Washington, D. C.

Application February 29, 1952, Serial No. 274,269

3 Claims. (Cl. 73—67)

(Granted under Title 35, U. S. Code (1952), sec. 266)

This invention relates to a testing machine and more particularly to a mechanical vibration testing machine which is adapted to produce in a platform vibrations of varying amplitudes and frequencies.

Heretofore vibration machines have been of the positive drive type or the reaction type. The positive drive type of vibration machine provides a cam or connecting linkage between the structural system to be tested and the drive means. The reaction type includes a rotating member to which weights are added or subtracted to provide vibrations of varying amplitudes. The most serious defect inherent in such structures from the standpoint of ease of operation is the lack of means for varying the amplitude of the vibrations while a test is in progress. Usually it is customary in establishing standards for testing structures, particularly ordnance equipment, to require vibration tests over a wide range of amplitudes and frequencies. In order to facilitate such tests it is necessary to provide a means for varying the amplitude of vibrations while the machine is in operation. In the prior art reaction type testers it is necessary to halt operations while weights are added or subtracted. In the positive drive vibrating testers the same difficulty is encountered, and in addition these devices require heavy supporting frames.

The present invention contemplates the use of a platform resiliently supported on a base which includes a frame for supporting the equipment necessary for operation. On the underside of the platform is mounted a vibration producing means consisting of weights fixedly mounted on a shaft and a counterweight which rotates with the shaft and may be moved with respect to the shaft. Mounted on the underside of the platform adjacent the vibration producing means is a means for rotating the counterweight with respect to the shaft. A motor having a speed changer connected therewith is provided for rotating the shaft. Normally the counterweight is in such a position that the center of gravity thereof is displaced 180° from the centers of gravity of the weights. When the counterweight is rotated from this normal position with respect to the weights, an unbalanced load is distributed on the shaft which will cause vibrations in the platform when the shaft is rotated by the motor. It is apparent that the frequency of vibration may be varied by altering the speed of rotation of the shaft through the speed changer whereas the amplitude of vibration may be varied by adjusting the position of the counterweight with respect to the weights. The amplitude of vibration can be changed at any time while the machine is in operation and, once set, will remain constant through the complete frequency range of the machine.

An object of the present invention is the provision of a vibration testing machine in which both the amplitude and frequency of vibration may be easily varied while the machine is in operation.

A further object of this invention is the provision of a reaction type vibration tester in which all elements are so supported within a common base that undesirable vibrations are not transmitted to the supporting structure and in which only a relatively light supporting frame is required thereby providing a device which is more easily portable than prior art structures.

Still another object of the present invention is the provision of a vibration tester in which all the control elements may be located in a panel remote from the vibration tester thereby insuring safety for the operator particularly when testing ordnance equipment.

Another object of this invention is the provision in a vibration tester of a vibration producing unit in which weights are fixedly mounted on a shaft and in which a counterweight is mounted for rotation with the shaft and is adjustable for movement with respect to the shaft whereby an unbalanced load may be distributed on the shaft by altering the position of the counterweight with respect to the shaft thereby producing vibrations upon rotation of the shaft.

Other objects and many of the attendant advantages thereof will become apparent from the following description taken in connection with the accompanying drawings in which:

Fig. 5 is a top plan view partly in section of a portion of the amplitude adjusting means; and Fig. 6 is a view in elevation of the limit switches used to limit movement of the slider bar.

Figure 1:
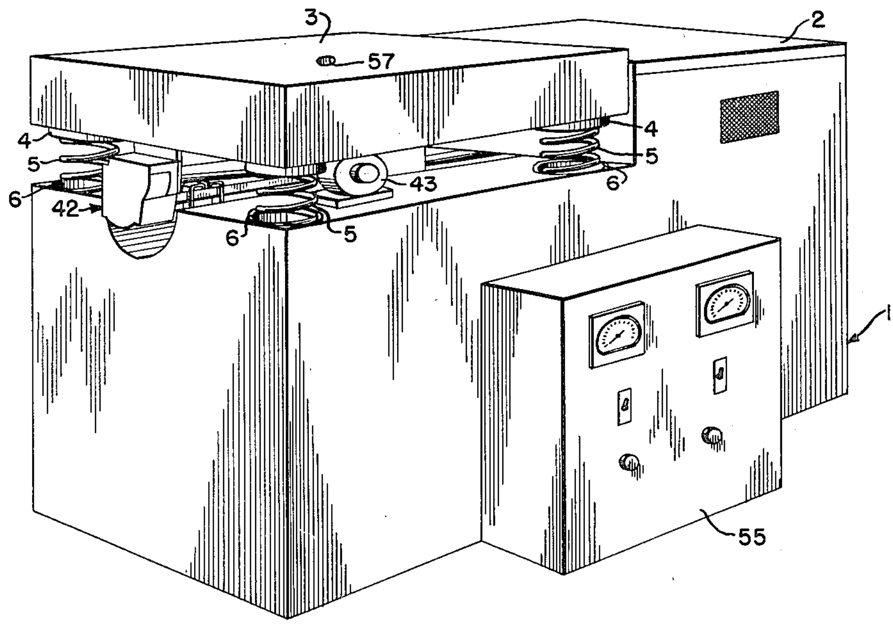
Fig. 1 is a perspective view of the vibration tester.

Referring now to Fig. 1 there is shown a base 1 which contains the supporting frame for the operative elements of the vibration tester. This base is provided with a hinged cover 2 in order that access may be had to the enclosed equipment. Adjacent the hinged cover and resiliently mounted within a recessed portion of the base is a vibration platform 3 upon which is mounted the equipment to be tested. At each of the corners of the platform on the underside thereof is secured an inverted cup 4, which cups are adapted to receive the upper ends of helical springs 5, the lower ends of which are fixed within supporting cups 6 mounted on the base. These helical springs constitute the sole supporting means for the platform, and it is apparent that the platform may be vibrated without undesirable motions being transmitted to the supporting base.

Figure 2:
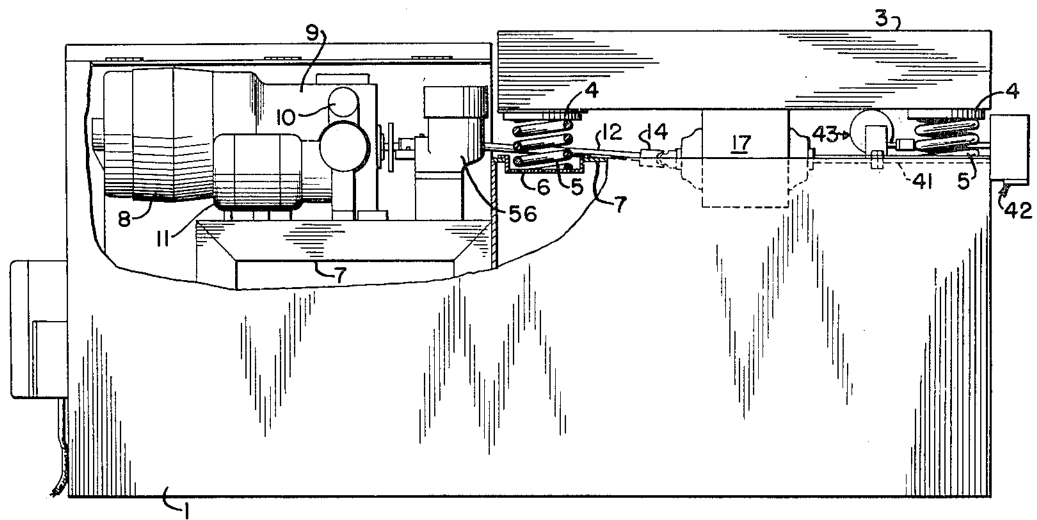
Fig. 2 is a view in elevation of the tester with parts broken away to show certain details.
Figure 3:
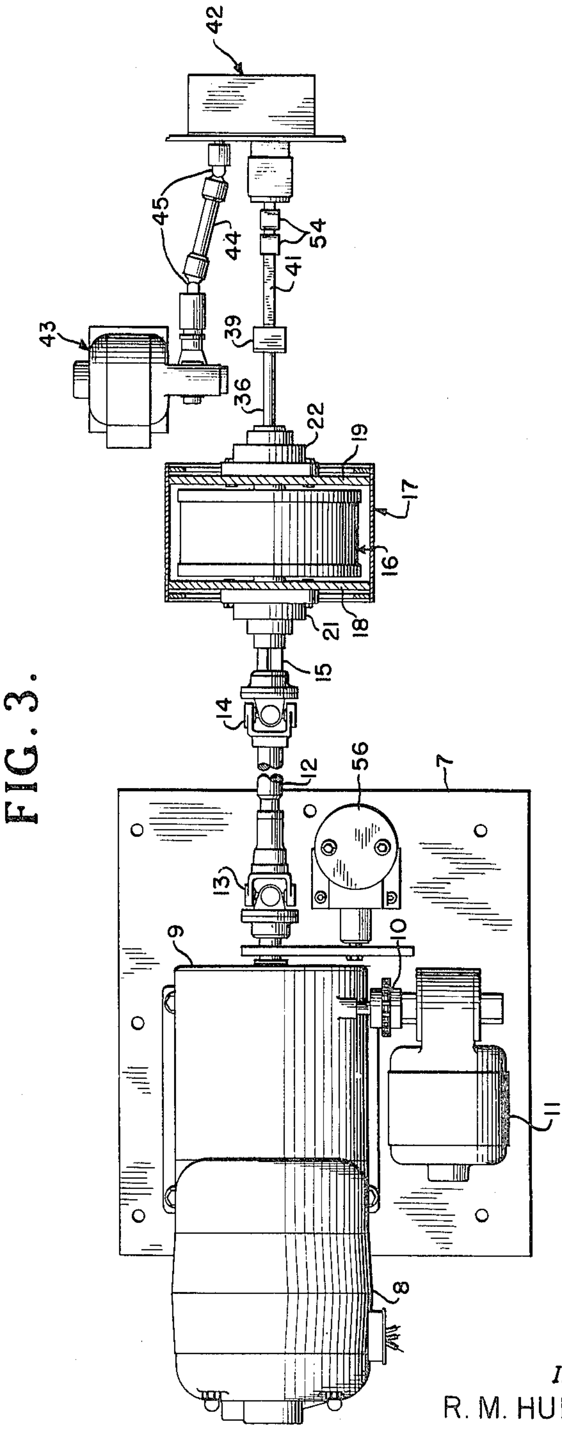
Fig. 3 is a top plan view of the complete vibrating means with certain parts shown in section.

In Fig. 2 is shown a portion of the supporting frame 7 which serves as a support for the drive means necessary to produce vibrations in the platform. Mounted on this frame beneath hinged cover 2 is a constant speed electric motor 8 including a speed changing device 9 of any known variety operated through a coupling 10 by reversible motor 11. The speed of rotation of shaft 12 which extends from the speed changer may be varied by energizing motor 11 which causes the speed changer to function. Shaft 12 is provided with universal joints 13 and 14 as shown in Fig. 3 which prevent transmission of vibrations from the platform through shaft 12 to the drive means. Attached to shaft 12 through universal joint 14 is shaft 15 which extends into the vibration producing drum 16. This drum is supported on the underside of platform 3 by means of housing 17 which includes side walls 18 and 19 of relatively heavy metal which are welded or otherwise suitably secured to the underside of the vibration platform. Apertures are centrally located in these side walls and secured to the side walls are ball bearing units 21 and 22.

Figure 4:
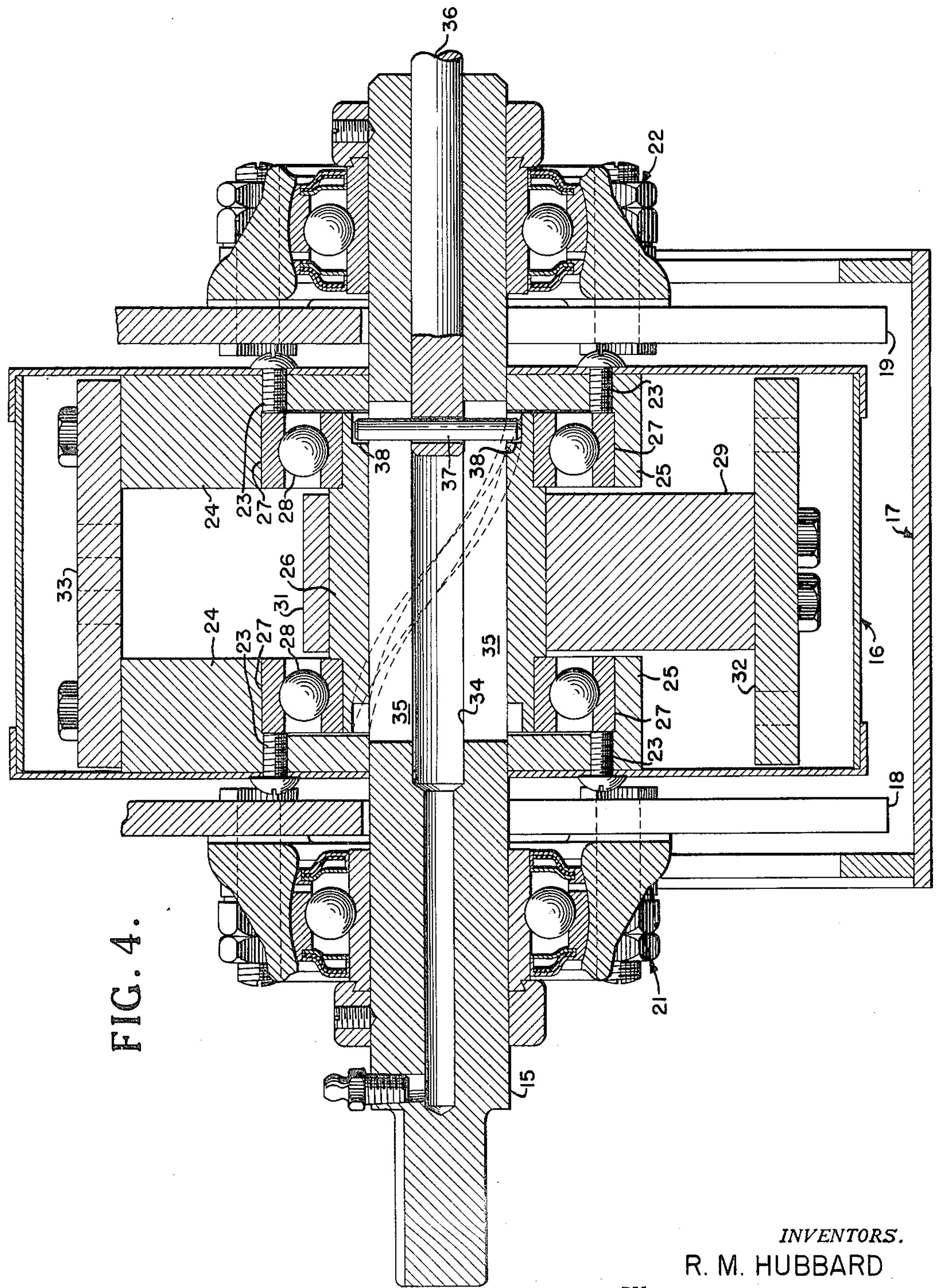
Fig. 4 is a sectional view in elevation of the vibration producing unit.

Referring now to Fig. 4 the construction and operation of the vibration producing drum 16 will be explained. Adjacent each end wall of the drum 16 is mounted as by screws 23, a weight 24, both weights being identical in construction. Each weight is provided with an offset aperture for passage of shaft 15 to which each weight is securely fastened by any suitable means (not shown). It is apparent therefore that, as shaft 15 is rotated, weights 24 and drum 16 will also rotate. Weights 24 are so shaped that the majority of the weight is disposed within an arc of approximately 90°, the remainder of the weight comprising a narrow portion 25 which extends around the periphery of the shaft. The weights are identically positioned on shaft 15 so that a line passing through their centers of gravity will be offset from and parallel to shaft 15. Rotatably mounted on shaft 15 between weights 24 is a sleeve 26 which extends into recessed portions 27 of weights 24 and portion 25. Disposed between sleeve 26 and weights 24 and portion 25 within recessed portions 27 are ball bearing units 28 which permit relative movement between sleeve 26 and weights 24. Securely mounted upon sleeve 26 in any suitable manner is a counterweight 29, the weight of which is equal to the sum of the weights 24. This counterweight is so shaped that the majority of the weight is disposed within an arc of 90°, the remainder of the weight comprising a narrow portion 31 which extends around the periphery of the sleeve. Secured to the outer surface of the counterweight is a plate 32 which offsets the weight of plate 33 which is securely fastened to weights 24. Shaft 15 is provided with an elongated bore 34 having interconnecting slots 35 spaced 180° apart and extending the length of sleeve 26. Within the bore is located a slider bar 36, the inner end of which is provided with a pin 37 which is fixed to the slider bar in any suitable manner. The inner surface of sleeve 26 is provided with helical grooves 38 spaced 180° apart and each extending through 180° of the inner surface of the sleeve. Pin 37 extends through slots 35 in shaft 15 into these helical grooves, and it can be seen that longitudinal movement of the bar 36 will impart rotary movement to sleeve 26 through movement of pin 37 in helical slots 38. Furthermore pin 37 will cause rotation of sleeve 26 upon rotation of shaft 15 by engagement with the side walls of slots 35. Thus it is apparent that a means has been provided whereby weights 24 and counterweight 29 will rotate upon rotation of shaft 15 and whereby the counterweight may be rotated independently with respect to the shaft 15 by longitudinal movement of bar 36. When the counterweight is in the position shown in Fig. 4 with the center of gravity spaced 180° from a line through the centers of gravity of weights 24, an even load is distributed about shaft 15 and upon rotation of the shaft no vibrations will be produced. However, if counterweight 29 is shifted with respect to the weights 24, an unbalanced load will be distributed on shaft 15 producing vibrations upon rotation of the shaft. It is apparent that the amplitude of vibration may be varied by altering the position of the counterweight with respect to the weights.

The slider bar extends from drum 16 and housing 17 through ball bearing unit 22 and is rotatably journalled in a thrust bearing 39 as shown in Fig. 3 which is fixedly mounted on the end of a shaft 41. This shaft is adapted to be driven longitudinally through a gear box 42 provided with a drive means 43 interconnected by a shaft 44 having universal joints 45. As may be seen from Fig. 1 the gear box 42 is fixedly mounted on the vibration platform, and the drive means 43 is mounted on the supporting base, the universal joints 45 on shaft 44 preventing transmission of vibrations from the platform to the frame. The shaft 44 extending from the drive means is journalled in a bearing 46 within the gear box 42 as shown in Fig. 5. Upon the end of this shaft is mounted a gear 47 which meshes with a gear 48 secured to the end of sleeve 49 which is rotatably journalled in bearing 51. Sleeve 49 is internally threaded to receive the threaded end portion 52 of shaft 41. Mounted on the supporting frame are limit switches 53 as shown in Fig. 6 which are connected by a suitable wiring circuit to the motor drive means 43 and which are adapted to be operated by means of flanged plates 54 secured to shaft 41. It is apparent that as shaft 41 is driven longitudinally, the engagement of a plate 54 with a switch 53 will cause deenergization of the drive means, halting the motion of shaft 41 in that direction. It is apparent that the shaft 41 is prevented from rotation by the means illustrated generally at 40.

There is provided a remote control panel 55 as seen in Fig. 1 from which the entire operation of the vibration tester may be controlled. Suitable switches are provided to energize the motor 8 and reversible motors 11 and 43. Further is provided a tachometer indicator suitably connected to a tachometer 56 as shown in Fig. 3. Secured within a bore in the center of the vibration platform 3 is an amplitude indicator or vibrometer 57 of any known construction which is suitably wired to an indicating instrument on the control panel 55. It is apparent that the control panel may be located at any desired point, and any desired adjustments on the vibration tester may be made independently of the machine itself. This is of particular advantage when ordnance equipment of highly explosive character is being tested in that a high degree of safety may be maintained.

The operation of the vibration tester will now be described. The equipment to be tested is secured to the platform in any desired manner and motor 8 is energized so that shaft 12, drum 16 and shaft 36 are rotated. The shaft speed may be varied from approximately 600 to 3600 revolutions per minute by manipulation of the suitable switch on the control panel to energize motor 11 to operate speed changer 9. The amplitude of vibration may be adjusted by operation of motor 43 which through gears 47 and 48 and sleeve 49 acts to move shafts 41 and 36 longitudinally thereby shifting the position of the counterweight to produce a varying degree of unbalance on shaft 15. The amplitude of vibration is measured by the vibrometer and the shaft speed by the tachometer, both variables being noted through the indicating instruments on the control panel. It is readily apparent that the shaft speed and the amplitude of vibration may be independently adjusted without halting operations. Since all vibrating parts are secured to the vibration platform, which is resiliently mounted, and, since the shafts connecting the vibrating parts with the fixedly mounted drive means are provided with universal joints, it can be seen that vibrations will not be transmitted to the supporting structure and that therefore only a relatively light supporting frame is required.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed as new and desired to be secured by Letters Patent is:

1. A mechanical vibration testing device comprising, a supporting frame, a platform, spring means resiliently mounting said platform on said supporting frame, a variable frequency vibration producing mechanical oscillator on said platform, a motor and a variable speed drive on said frame having a shaft extending horizontally therefrom to a position beneath said platform, a drive shaft including a pair of universal joint means interposed between said variable speed drive and said oscillator for driving the oscillator from said motor, a first shaft in said oscillator, means for rotatably journalling said first oscillator shaft on said platform, a plurality of vibration producing masses in said oscillator and connected for rotation with said oscillator shaft, a concentric sleeve on said shaft directly connected to rotate a first one of said plurality of masses therewith, journaling means for a second one of said plurality of masses, and mounted on said sleeve, said last named journalling means providing independent rotation of said first named mass with respect to said second one of said plurality of vibration producing masses, a longitudinal bore in one end of said first shaft, a straight longitudinal slot extending transversely through an intermediate portion thereof, an actuator movable into the longitudinal bore and extending from one end thereof, a spiral groove in said concentric sleeve, a key on said actuator disposed between said slotted portion of said shaft and said spiral groove in the sleeve for varying the angular displacement of said first one of said masses with respect to said second mass when said key is moved along the longitudinal slot by the actuator, said key and actuator being rotatable with said first shaft, a thrust bearing disposed at the end of said actuator remote from said key, and a second non-rotatable actuator means for providing longitudinal movement of said actuator, and connected to said thrust bearing, means including a motor drive for converting rotary movement to linear movement for said second named actuator to continuously vary the amplitude of vibration produced by the oscillator by angular displacement of one of the masses with respect to the other while the device is in operation.

2. A vibration testing device comprising a platform, resilient means supporting said platform, drive means, a shaft extending from said drive means beneath said platform and having an internal bore open at one end thereof and terminating in an elongated transverse slot extending through the shaft, said shaft being rotatably journalled on said platform, a plurality of weights secured to said shaft and having the centers of gravity thereof offset with respect to said shaft and in a line parallel to the longitudinal axis of said shaft, a sleeve rotatably mounted on said shaft and having a helical slot in the bore thereof, a counterweight secured to said sleeve and having the center of gravity thereof offset with respect to said shaft and normally angularly displaced 180° with respect to the centers of gravity of said weights, means including a slider element movable in the bore of said shaft and having a transverse key which is coactive with said elongated slot in said shaft and the helical slot in said sleeve for interconnecting said sleeve and said shaft whereby said counterweight is rotatable by said drive means with said shaft and differentially positionable with respect to said weights by longitudinal movement of said key in the slot, and means for continuously varying the amplitude of vibration caused by said weights, which said last-named means comprises a thrust bearing for said slider, a second non-rotative slider connected at one end thereof to said thrust bearing, and a motion translating device for changing rotary motion to linear motion and connected to the opposite end of said second slider for varying the amplitude of vibration by altering the angular displacement of the center of gravity of said counterweight with respect to the center of gravity of said weight as said last named means is actuated whereby upon rotation of said first named shaft by said drive means vibration will be produced in said platform, a motor on said frame and operatively connected to said last named means for actuation thereof, and means for remotely controlling the operation of said drive means and the motor.

3. In a mechanical vibration testing device comprising support means, a platform, resilient means mounting said platform on said support means, a mechanical vibration inducing means, motor drive means, a shaft extending horizontally from said vibration inducing means and from beneath said platform, a shaft linkage including universal joint means provided on said shaft between said drive means and said vibration means for providing rotation of said shaft, means rotatably journalling said shaft on said platform, means for mounting a first weight to said vibrator shaft and eccentrically with respect thereto, a sleeve member coaxial with said vibrator shaft, means for mounting a counterweight for angular movement with respect to said first weight, bearing means mounted between said sleeve and said weights, the center of gravity of said counterweight being offset with respect to said shaft and normally displaced 180° from the center of gravity of said first named weight, an internal bore in said shaft, a slider bar disposed in said bore for longitudinal movement with respect to said shaft, an operator on said rotatably mounted slider bar extending radially therefrom, said shaft being provided with a longitudinal slot, a helical groove in the inner surface of said sleeve, said operator extending through said slot into said groove, an actuating device for said slider bar and operator mounted on said platform and comprising gear means operatively connected to said slider bar for actuation thereof, a non-rotative actuator, means including a non-rotatable threaded portion on said actuator and a rotatably driven threaded sleeve for translating rotation by said gear means into longitudinal movement of said actuator, a motor operatively connected to said gear means and secured to said support means for driving said gear means, and means remotely disposed from said tester for controlling the operation of said motor drive and the last named motor.

References Cited in the file of this patent

UNITED STATES PATENTS

| | | |
|---|---|---|
| 1,500,988 | Goldschmidt | July 8, 1924 |
| 1,610,487 | Brinton | Dec. 14, 1926 |
| 1,876,527 | Thearle et al. | Sept. 6, 1932 |
| 2,127,317 | Welch | Aug. 16, 1938 |
| 2,238,116 | Kelly | Apr. 15, 1941 |
| 2,410,170 | Lazan | Oct. 29, 1946 |
| 2,445,175 | Hittson | July 13, 1948 |
| 2,547,764 | Lindenberg et al. | Apr. 3, 1951 |